United States Patent [19]

Baldwin

[11] Patent Number: 4,929,943
[45] Date of Patent: May 29, 1990

[54] MARINE COMPASS RATE-OF-TURN INDICATOR

[75] Inventor: Chris J. Baldwin, Earlysville, Va.

[73] Assignee: Sperry Marine, Inc.

[21] Appl. No.: 214,704

[22] Filed: Jul. 1, 1988

[51] Int. Cl.⁵ .............................................. G08B 23/00
[52] U.S. Cl. ................. 340/984; 73/178 R; 73/504; 74/5.6 E
[58] Field of Search ............... 340/974, 979, 984, 987; 33/324, 328; 73/178 R, 180, 504; 116/35 R, 286, 289; 74/5.6 D, 5.6 E, 5.9

[56] References Cited

U.S. PATENT DOCUMENTS

| | | | |
|---|---|---|---|
| 1,815,575 | 7/1931 | Mills | 340/987 |
| 3,337,845 | 8/1967 | Hart | 340/974 |
| 3,906,483 | 9/1975 | Fowler | 340/706 |
| 3,967,499 | 7/1976 | Whipps | 73/178 R |
| 4,117,482 | 9/1978 | Jepsky et al. | 364/456 |
| 4,139,951 | 2/1979 | Cunard et al. | 33/362 |
| 4,161,884 | 7/1979 | Shigenobu | 73/504 |
| 4,316,389 | 2/1982 | Shannon | 74/5.6 E |
| 4,342,226 | 8/1982 | Engel et al. | 73/504 |
| 4,420,741 | 12/1983 | West | 340/984 |
| 4,663,627 | 5/1987 | Dennis | 73/178 R |
| 4,682,171 | 7/1987 | Nakamura | 73/178 R |

*Primary Examiner*—Joseph A. Orsino
*Assistant Examiner*—Brent Swarthout

[57] ABSTRACT

An array of light emitting diodes in a circular arrangment are illuminated to indicate the discrete magnitude of rate-of-turn and the direction of turn. The number of diodes illuminated is indicative of the discrete magnitude of turn and the clockwise or counterclockwise direction of illumination of the diodes is indicative of the turn direction. The current and preceding samples of the gray coded step data compass heading output are compared to detect incremental changes in heading. The incremental changes are counted over a predetermined time interval to provide a count signal representative of turn rate. Logic responsive to the count signal illuminates the appropriate number of light emitting diodes. Further logic responsive to the gray code heading data sequence provides a direction of turn signal to illuminate the light emitting diode in a clockwise or counterclockwise direction.

7 Claims, 6 Drawing Sheets

MARINE COMPASS RATE-OF-TURN INDICATOR

BACKGROUND OF THE INVENTION

1. Field of the Invention

The invention relates to marine compasses, particularly with respect to rate-of-turn indicators for gyrocompasses.

2. Description of the Prior Art

Marine gyrocompass systems often include a rate-of-turn indicator as an aid to navigation that displays the rate at which the ship is turning and the direction of turn. It is desirable in certain applications to display rate-of-turn in a discrete format over a wide range of turn rates. For example it is desirable to display turn rate from 0 to 15 degrees per second with a quantized resolution of one degree per second. Available prior art rate-of-turn displays do not provide such capability. One type of prior art device displays rate-of-turn as a relative value not as a discrete. The display is a linear arrangement of light emitting diodes (LEDs) with a common center. When the compass indicates, for example, a clockwise rotation of the vessel, the right half of the line of LEDs beginning at the center sequentially illuminate and remain on until the entire right half side of the LEDs are illuminated. Thereafter, all of the LEDs begin flashing at a frequency proportional to the rate at which the ship is turning. Such a display provides an impression of movement but not actual turn rate values. Another type of available prior art device displays direction and rate-of-turn in a continuous format on an analog meter and only up to one degree per second. This device operates on principles different from that utilized in the present invention.

SUMMARY OF THE INVENTION

The rate-of-turn indicator of the present invention receives incremental compass data such as gyrocompass step data and provides a quantized visual rate-of-turn indication by actuating a sequence of discrete visual indicators in accordance with the magnitude and direction of turn. In the preferred embodiment, a circular array of LEDs are utilized representing increasing increments of one degree per second respectively. The LEDs are activated from zero to the turn value and remain lit until the turn rate changes. The direction of turn is indicated by whether the LEDs are illuminated from zero in a clockwise or counterclockwise direction. The step data is sampled by a comparator that increments a counter whenever the step data changes. The counter is periodically reset and provides an indication of the number of compass step data increments occurring within the period between resets. Thus, the counter output provides a signal representative of the magnitude of the rate-of-turn. An examination of the step data sequence provides the direction of turn. Logic is included responsive to successive step data values and responsive to the counter output to illuminate the LEDs to provide the desired rate-of-turn indication. In the preferred embodiment, fifteen LEDs are utilized to provide turn rate from zero to fifteen in degrees per second and to indicate the clockwise or counterclockwise direction of the turn.

BRIEF DESCRIPTION OF THE DRAWINGS

FIG. 2 comprising

FIG. 3 comprising

DESCRIPTION OF THE PREFERRED EMBODIMENT

Figure 1:
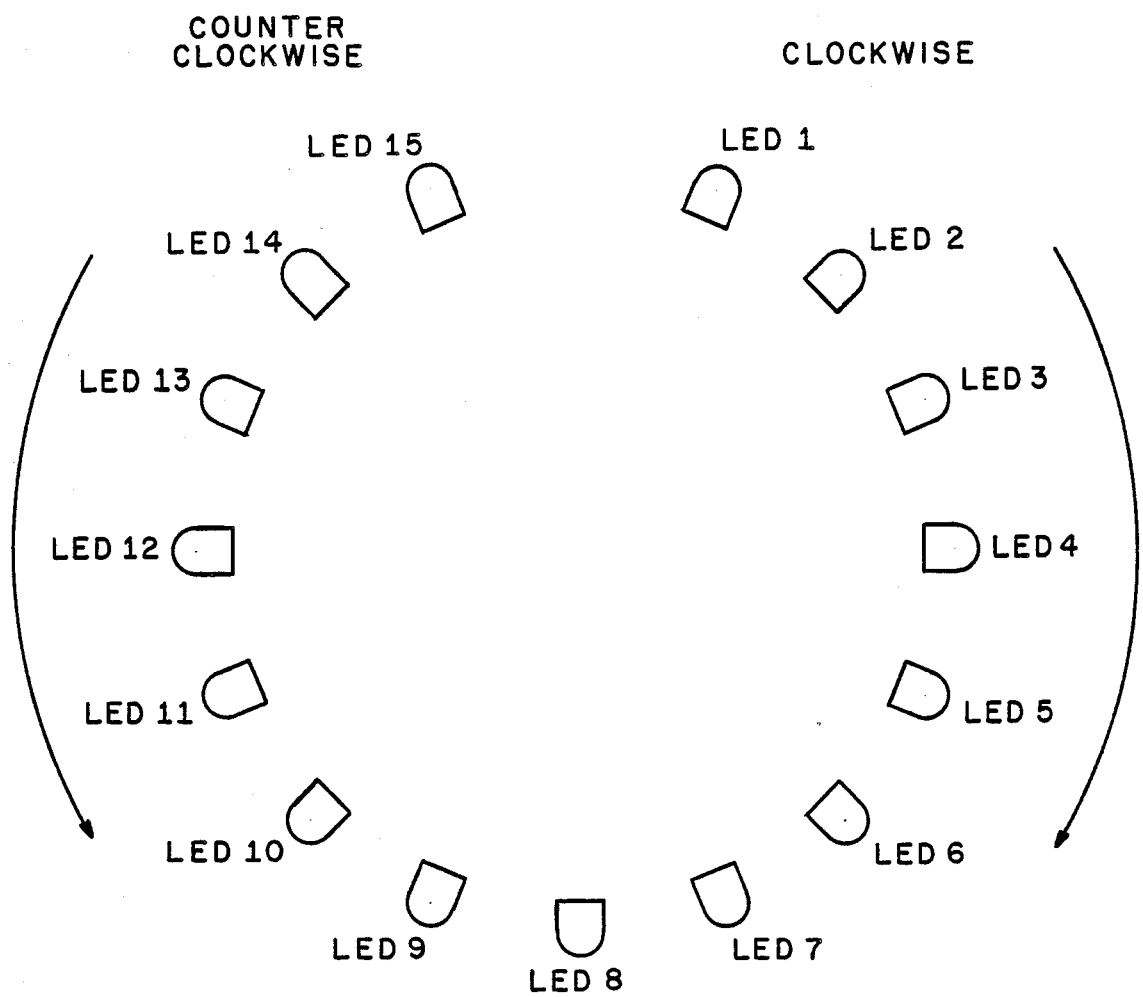
FIG. 1 is a plan view of the LED rate-of-turn display arrangement.

Referring to FIG. 1, the circular arrangement of fifteen LEDs that displays rate-of-turn and direction in degrees per second is illustrated. Each of the LEDs 1–15 represents a one degree per second change in heading. With each succesive rate increase in degrees per second, an additional LED is illuminated. Thus, for example, when the gyrocompass is changing at four degrees per second in a clockwise direction, LEDs 1–4 are illuminated. If the turn were in a counterclockwise direction, LEDs 12–15 would be illuminated. For a change of 15° per second, all of the LEDs are illuminated. Thus, as the ship first enters a turn in, for example, a clockwise direction, LED 1 will first be illuminated followed by LED 2 until all of the LEDs up to the turn rate become illuminated. As the ship resumes a straight line course, the LEDs from the most significant illuminated will extinguish until all of the LEDs are extinguished when the turn is completed.

Figure 2A:
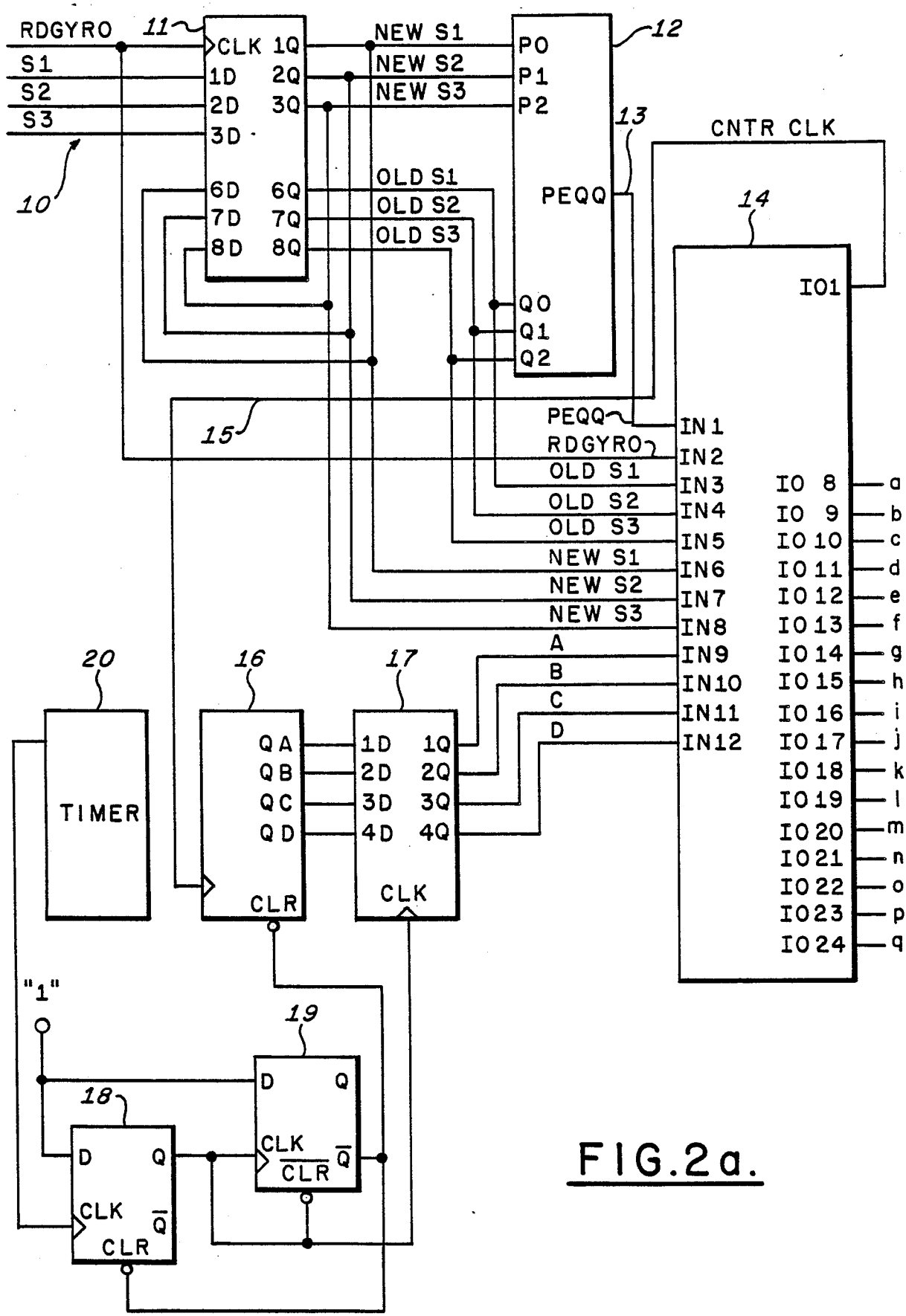
FIGS. 2A, 2B and 2C is a schematic block diagram of the gyrocompass rate-of-turn indicator implemented in accordance with the present invention.
Figure 2B:
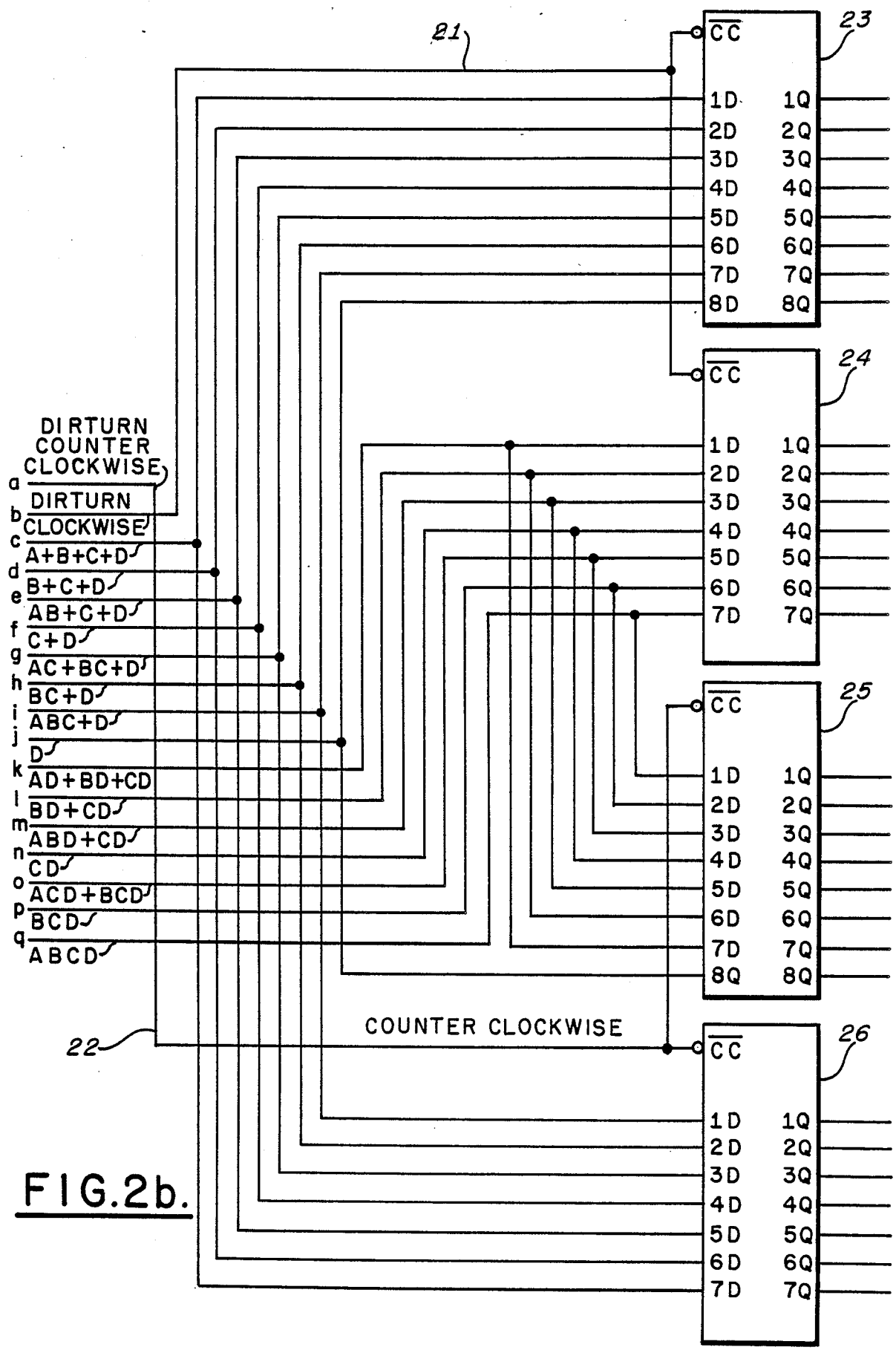
Figure 2C:
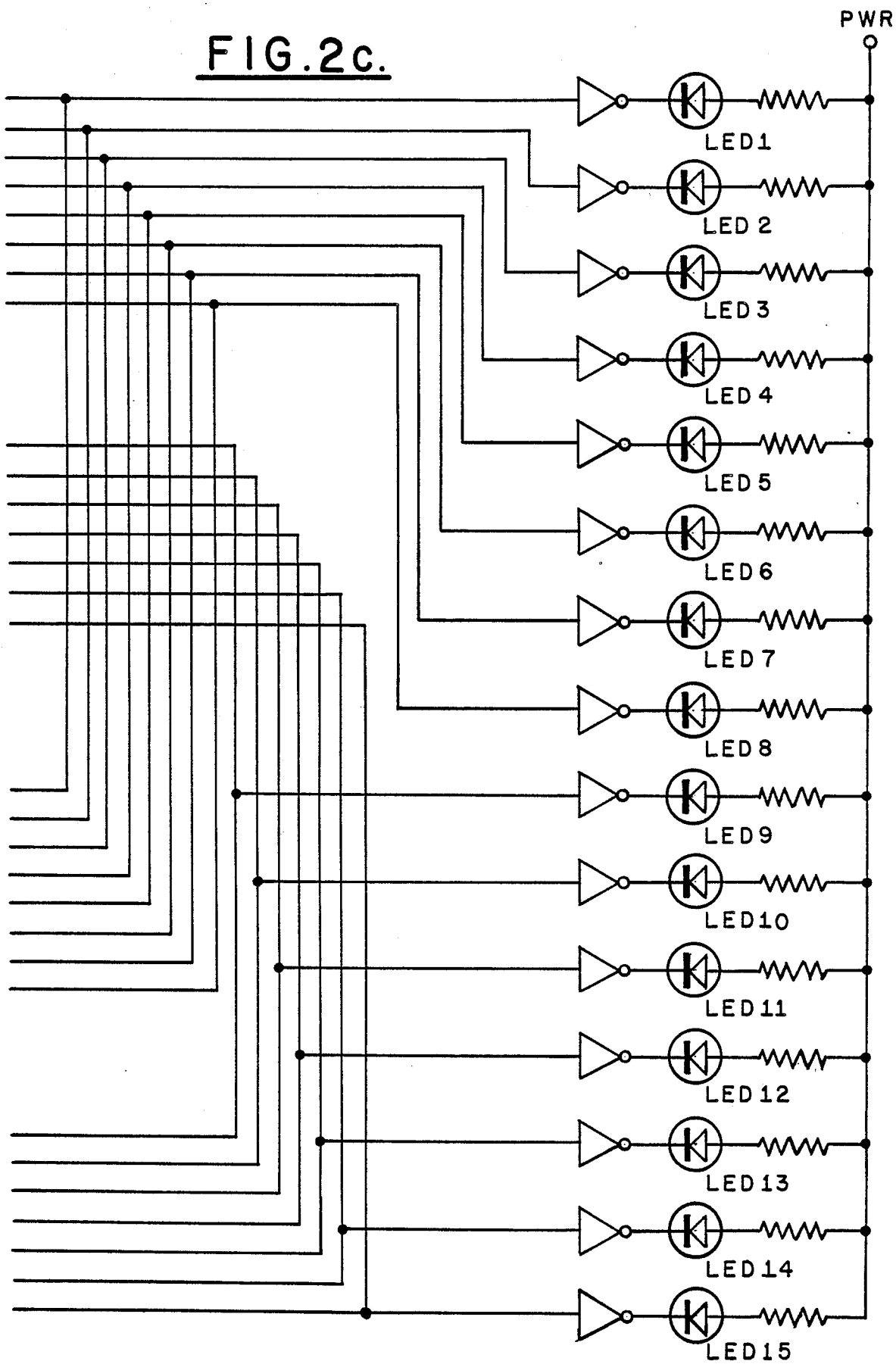

Referring to FIG. 2, a schematic block diagram of the gyrocompass rate-of-turn indicator of the present invention is illustrated. The rate-of-turn indicator system of FIG. 2 receives step formatted heading data (S1, S2, S3) and a sampling signal (RDGYRO) from the gyrocompass interface at a connector 10. The step data signals represent 1/6° changes in heading via a three bit gray code sequence. The gray code sequence generated in response to clockwise and counterclockwise rotational directions are as follows:

TABLE 1

| CLOCKWISE | | | COUNTERCLOCKWISE | | |
|---|---|---|---|---|---|
| S | S2 | S3 | S1 | S2 | S3 |
| 0 | 1 | 1 | 0 | 1 | 1 |
| 0 | 1 | 0 | 0 | 0 | 1 |
| 1 | 1 | 0 | 1 | 0 | 1 |
| 1 | 0 | 0 | 1 | 0 | 0 |
| 1 | 0 | 1 | 1 | 1 | 0 |
| 0 | 0 | 1 | 0 | 1 | 0 |
| 0 | 1 | 1 | 0 | 1 | 1 |

In the system of the present invention, each gray code count represents 1/6° of rotation and the number of changes in count over a predetermined time interval provides the rate of turn measurement in a manner to be described. The clockwise and counterclockwise gray code sequences are utilized to determine the direction of rotation. The RDGYRO signal samples the step data at a rate substantially greater than the largest turn rate to be encountered by the system.

The three step data lines S1, S2 and S3 are input to an edge-triggered latch 11. The latch 11 is clocked by the RDGYRO signal. The current step data sample is latched to the 1Q, 2Q and 3Q outputs of the latch 11 by the RDGYRO clock. These latched outputs are denoted as NEW S1, NEW S2, AND NEW S3 (collectively denoted as NEW) and represent the latest step data sample. The NEW signals are fed around to three additional inputs of the latch 11 and when latched therein by the RDGYRO clock provide latched outputs of NEW. These latched outputs from 6Q, 7Q and 8Q outputs of the latch 11 are denoted as OLD S1, OLD S2, AND OLD S3 (colllectively denoted as OLD). Thus it is appreciated that the NEW outputs of the latch 11 represent the latest acquired sample of the gyrocompass step data and the OLD outputs thereof represent the step data acquired in the previous sample time. The latch 11 may be implemented by a 74LS374 integrated circuit.

The NEW signals and the OLD signals from the latch 11 are applied to the P and Q inputs, respectively, of a comparator 12. The comparator 12 continuously compares the NEW inputs with the OLD inputs and provides a logic high on a line 13 whenever NEW is equal to OLD. When NEW changes with respect to OLD, the signal on the line 13 goes low. The comparator 12 may be implemented by a 74LS85 integrated circuit with an output denoted as PEQQ. PEQQ provides the signal to the line 13 representative of the equality between the P inputs (NEW) and the Q input (OLD).

The PEQQ signal on the line 13 and the RDGYRO step data sampling signal are applied to an Erasable Programmable Logic Device 14 (EPLD). The EPLD 14 may be implemented by an EP900 integrated circuit. The EPLD 14 provides a CNTR CLK signal on a line 15 to the clock input of a four stage binary counter 16. In a manner to be detailed, the EPLD 14 increments the counter 16 whenever NEW is not equal to OLD and RDGYRO is high. Thus, it is appreciated that the counter 16 is incremented each time one of the step data lines changes state. When one of the step data lines changes state, the compass has rotated 1/6th of a degree. Therefore, each time RDGYRO is high and any pair of the NEW and OLD step data lines differs in logic state, a 1/6° change in heading has occurred. The counter 16 may be implemented by a 74LS161A integrated circuit.

The output of the counter 16 (denoted as D, C, B, A) is applied to a latch 17. A is the least significant bit of the counter 16 and D is the most significant bit thereof. The latch 17 may be implemented by a 74LS174. The latched count value is provided to the EPLD 14 for decoding therein in a manner to be described.

It is appreciated that the counter 16 is not counting degrees but 1/6°. In order to obtain a 1° per second measurement, the counter 16 is reset six times per second and the latch 17, which contains the count value, is clocked six times per second. This yields a display in degrees per second since the counter 16 is counting the number 1/6° increments occurring in a time interval of 1/6 second. The latch 17 is updated just prior to clearing the counter 16 in order to retain the current count value. Dual D-flip-flops 18 and 19 are utilized to so clear and clock the counter 16 and the latch 17, respectively. The D inputs of both flip-flops 18 and 19 are connected to a source of logic ONE. The flip-flop 18 is clocked from a timer 20 that provides a 6 Hz clocking signal thereto. When the flip-flop 18 is closed by the timer 20, the Q output thereof goes high. The transition of the Q output of the flip-flop 18 from low to high clocks the latch 17 causing the count value at the input thereof to be latched to the output thereof and remain stored therein until another clock pulse occurs. The Q output of the flip-flop 18 also clocks the flip-flop 19 causing the Q' output thereof to go low. The Q' signal from the flip-flop 19 clears the counter 16 and also resets the flip-flop 18 to the low state preparing it for another clock pulse from the timer 20.

Decoding the count value (D,C,B,A) from the latch 17 and decoding the direction of turn from the gray code sequences of Table 1 above is performed by the code contained in the EPLD 14. The details of this code will be described hereafter with respect to FIG. 3. Accordingly, the EPLD 14 is coupled to receive the NEW and OLD signals from the latch 11 as well as the D, C, B, A outputs from the latch 17. As described above, the four outputs of the counter 16 are denoted as D, C, B, A with D being the most significant bit of the count value. The logical states of the lines as a group represent the hexidecimal number of the rate-of-turn as follows:

TABLE 2

| OUTPUT DCBA | ACTIVE LEDs 123456789ABCDEF CW FEDCBA987654321 CCW |
|---|---|
| 0000 | |
| 0001 | 1 |
| 0010 | 11 |
| 0011 | 111 |
| 0100 | 1111 |
| 0101 | 11111 |
| 0110 | 111111 |
| 0111 | 1111111 |
| 1000 | 11111111 |
| 1001 | 111111111 |
| 1010 | 1111111111 |
| 1011 | 11111111111 |
| 1100 | 111111111111 |
| 1101 | 1111111111111 |
| 1110 | 11111111111111 |
| 1111 | 111111111111111 |

The decoding equations which activate the LEDs response to the four latched count value output lines is as follows:

TABLE 3

| LED EQUATIONS | | |
|---|---|---|
| CCW | CW | |
| LED 15 | LED 1 | = D + C + B + A |
| LED 14 | LED 2 | = D + C + B |
| LED 13 | LED 3 | = D + C + AB |
| LED 12 | LED 4 | = D + C |
| LED 11 | LED 5 | = D + CB + CA |
| LED 10 | LED 6 | = D + CB |
| LED 9 | LED 7 | = D + CBA |
| LED 8 | LED 8 | = D |
| LED 7 | LED 9 | = DC + DA + DB |
| LED 6 | LED 10 | = DC + DB |
| LED 5 | LED 11 | = DC + DBA |
| LED 4 | LED 12 | = DC |
| LED 3 | LED 13 | = DCA + DCB |
| LED 2 | LED 14 | = DCB |
| LED 1 | LED 15 | = DCBA |

The direction of turn equation is given by $$
\begin{aligned}
\text{DIRTURN} = \ &OS2 * OS1' * NS1 * NS3' + OS3' * NS1 * NS2' * D + \\
&OS2' * OS1 * NS3 * D + OS1' * OS3 * NS2 * NS3' + \\
&OS2' * OS3' * NS3 + OS2' * OS1' * NS1' * NS2 + \\
&OS2' * OS3 * NS1' * D + OS2 * OS1 * NS1 * D + \\
&OS1' * OS3' * NS3' * D + OS1' * OS3 * NS2 * D +
\end{aligned}
$$

-continued

| | | | | | | | |
|---|---|---|---|---|---|---|---|
| OS2 | * OS1 | * NS1 | * NS2' | + OS1 | * OS2' | * NS1' | * NS3 |

DIRTURN is high for the clockwise direction of turn and low for the counterclockwise direction of turn. The primed quantities indicate the inverse of the signal logic state and the symbols "O" and "N" represent OLD and NEW respectively. The symbol "D" represents the value of DIRTURN from the previous sample.

Figure 3A:
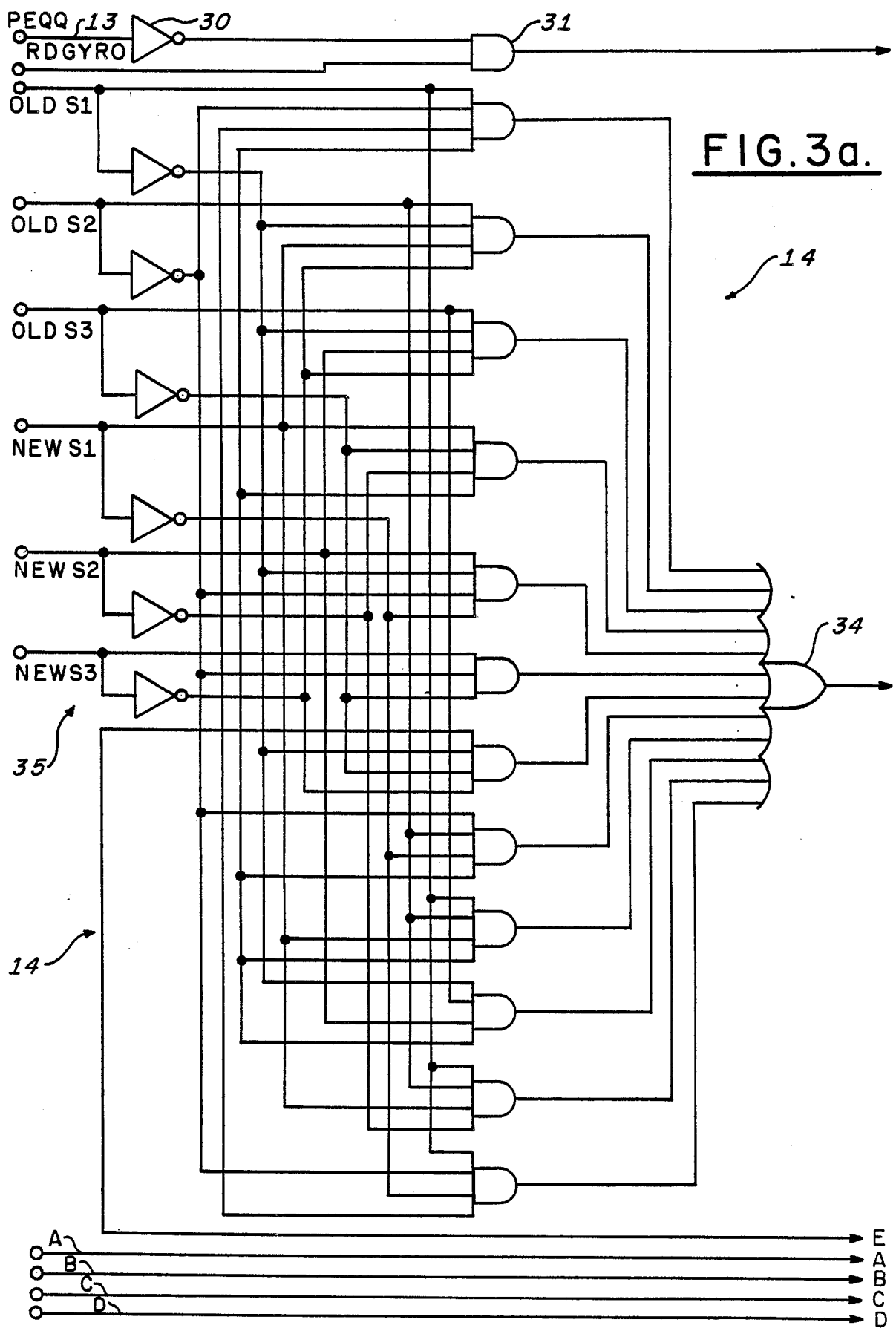
FIGS. 3A and 3B is a schematic logic diagram of the erasable programmable logic device (EPLD) of FIG. 2 illustrating the logic code utilized to decode the rate-of-turn magnitude count value and to determine the direction of turn.
Figure 3B:
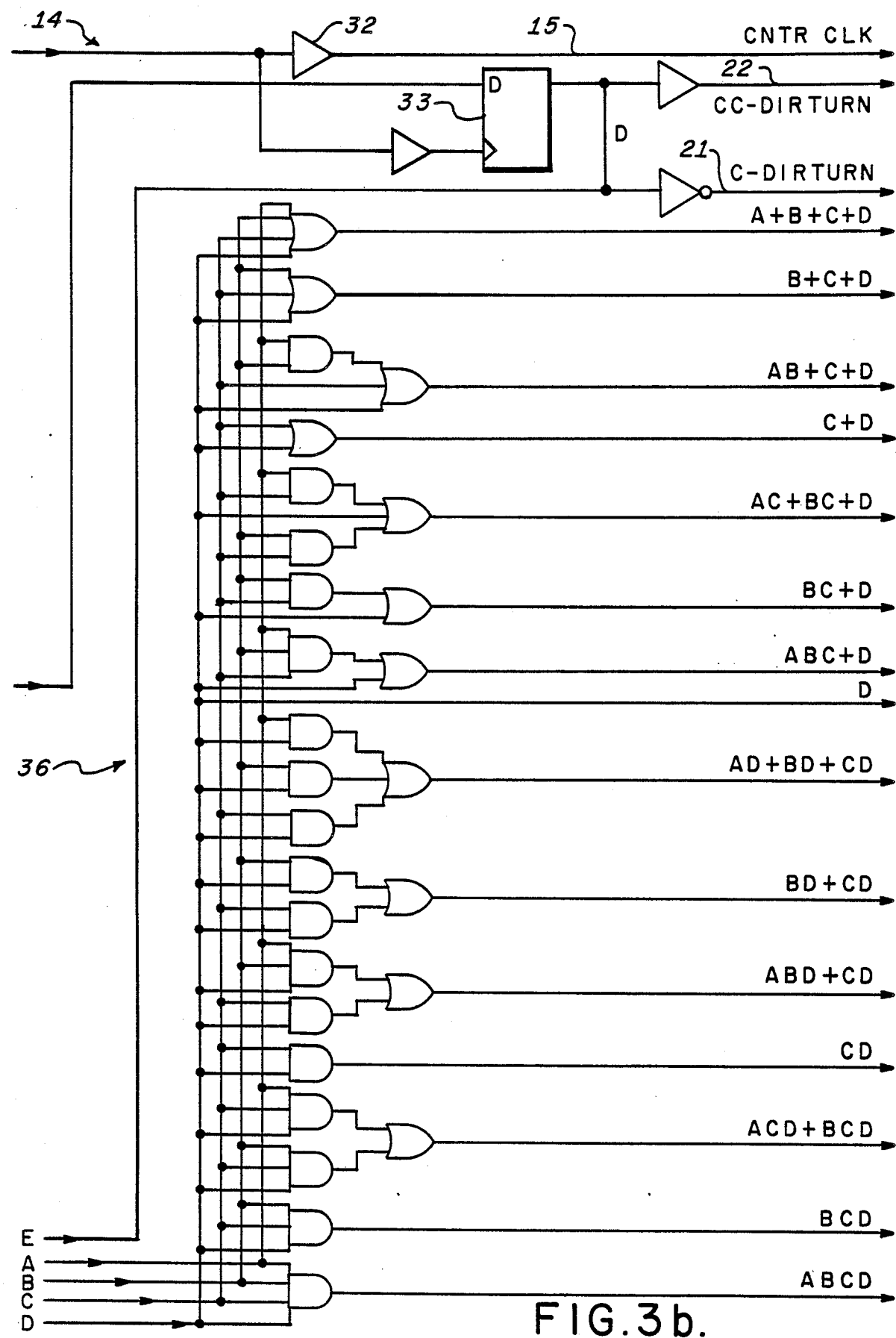

With continued reference to FIG. 2, the direction of turn is determined by reading the OLD and NEW lines along with the DIRTURN present direction of turn output in a manner to be further described with respect to FIG. 3. Depending on the state of the sampled lines, the EPLD 14 energizes a control line 21 for clockwise rotation or a control line 22 for counterclockwise rotation. The control line 21 enables a pair of latches 23 and 24 which activate the LEDs (LED 15–LED 1) in a clockwise order. The control line 22 enables a pair of latches 25 and 26 which activate the LEDs (LED 15–LED 1) in a counterclockwise order. Depending on the direction of rotation, LED 1 is either the LSB or the MSB. The direction of rotation is calculated utilizing the gray code sequences of the step data lines as delineated above in Table 1. The latches 23–26 may be implemented by 74LS373 integrated circuits. The latches 23–26 are coupled to receive the LED equation outputs from the EPLD 14 to illuminate the appropriate LEDs as delineated in Table 3 above.

Referring to FIG. 3, the code stored in the EPLD 14 is illustrated. The EPLD 14 inverts the PEQQ signal on the line 13 via an inverter 30 and applies this signal together with RDGYRO to an AND gate 31 to provide the CNTR CLK signal on the line 15 via a driver 32. The output of the AND gate 31 drives the clock input of a D-flip-flop 33 which provides the clockwise and counterclockwise signals on the control lines 21 and 22 of FIG. 2. The D input of the flip-flop 33 is driven from an OR gate 34 which combines the outputs from direction of turn logic 35. The direction of turn logic 35 decodes the gray code sequences of Table 1 in accordance with the DIRTURN equation to provide the appropriate direction of turn control signal on the lines 21 and 22. The output of the flip-flop 33 provides a logic signal representative of the DIRTURN equation. Logic 35 is responsive to the OLD and NEW step data signals as discussed above with respect to FIG. 2. Logic 36 responsive to the output of the counter 16 stored in the latch 17 implements the LED equation of Table 3 for illuminating the appropriate LEDs.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. Rate-of-turn indicator apparatus for use with a marine compass that provides heading data in incremental coded sequence format, comprising:
   detecting means coupled to said marine compass for detecting increments of change of said heading data and for providing increment of change representative signals,
   counting means responsive to said increment of change representative signals for counting said increments of change over a predetermined time interval, thereby providing a rate-of-turn count signal,
   first logic means responsive to said coded sequence heading data for generating a signal representative of direction of turn,
   a plurality of discrete visual indicator means responsive to said rate-of-turn count signal for providing visual indications of discrete increments of rate-of-turn, and responsive to said signal respresentative of direction of turn for providing a visual indication of said direction of turn, and
   second logic means responsive to said count signal for activating and indicator means in accordance with said count signal so as to provide a discrete indication of said discrete increments of said rate-of-turn.

2. The apparatus of claim 1 wherein said plurality of discrete visual indicator means are arranged in a geometrical pattern so as to provide said visual indication of said direction of turn in response to said direction of turn signal.

3. The apparatus of claim 2 wherein said plurality of discrete visual indicator means are arranged in a curvilinear pattern.

4. The apparatus of claim 3 wherein said plurality of discrete visual indicator means comprises a plurality of light emitting devices arranged in a substantially circular pattern wherein each said light emitting device is representative of a discrete increment of said rate-of-turn.

5. The apparatus of claim 4 wherein said logic means and said further logic means are so constructed and arranged to actuate a number of said light emitting devices in accordance with said rate-of-turn signal in a clockwise or counterclockwise direction in accordance with said direction of turn signal.

6. The apparatus of claim 1 wherein said detecting means comprises:
   latch means responsive to said heading data for storing two sequential samples thereof, and
   comparator means responsive to said two sequential samples for providing a signal representative of inequality therebetween,
   thereby providing said increments of change of said heading data.

7. The apparatus of claim 1 wherein said heading data are provided in a gray code step data sequence.

* * * * *